United States Patent
Pujia et al.

(10) Patent No.: US 10,757,451 B2
(45) Date of Patent: Aug. 25, 2020

(54) USER CENTRIC SERVICE AND CONTENT CURATION THROUGH IN-FLIGHT ENTERTAINMENT SYSTEM

(71) Applicant: Thales Avionics, Inc., Irvine, CA (US)

(72) Inventors: Steven James Pujia, Lake Elsinore, CA (US); Brian Johnson, Dana Point, CA (US); Thomas Moeller, Berkeley, CA (US); Thomas Kleist, Menlo Park, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 15/932,319

(22) Filed: Feb. 16, 2018

(65) Prior Publication Data

US 2018/0234707 A1    Aug. 16, 2018

Related U.S. Application Data

(60) Provisional application No. 62/459,861, filed on Feb. 16, 2017.

(51) Int. Cl.
| | |
|---|---|
| *H04N 7/18* | (2006.01) |
| *H04N 21/436* | (2011.01) |
| *H04N 21/214* | (2011.01) |
| *H04N 21/472* | (2011.01) |
| *H04N 21/414* | (2011.01) |

(Continued)

(52) U.S. Cl.
CPC ... *H04N 21/2146* (2013.01); *H04N 21/41407* (2013.01); *H04N 21/4223* (2013.01); *H04N 21/4227* (2013.01); *H04N 21/436* (2013.01); *H04N 21/4415* (2013.01); *H04N 21/44227* (2013.01); *H04N 21/4532* (2013.01); *H04N 21/4668* (2013.01); *H04N 21/4755* (2013.01); *H04N 21/4756* (2013.01); *H04N 21/47202* (2013.01)

(58) Field of Classification Search
CPC ........ H04N 21/2146; H04N 21/41407; H04N 21/4223; H04N 21/4227; H04N 21/436; H04N 21/4415; H04N 21/44227; H04N 21/4532; H04N 21/4668; H04N 21/47202; H04N 21/4755; H04N 21/4756
USPC ......................................................... 725/77
See application file for complete search history.

(56) References Cited

U.S. PATENT DOCUMENTS

| | | | |
|---|---|---|---|
| 8,539,357 B2* | 9/2013 | Hildreth | G06K 9/00335 715/733 |
| 2003/0023980 A1* | 1/2003 | Kikinis | H04N 21/4532 725/100 |

(Continued)

*Primary Examiner* — Nnenna N Ekpo
(74) *Attorney, Agent, or Firm* — Sage Patent Group

(57) ABSTRACT

A controller device in communication with service delivery devices of an aircraft in-flight entertainment (IFE) system receives objective information associated with an aircraft comprising the aircraft IFE system. The controller device also receives subjective passenger information associated with a passenger of the aircraft. A service is determined to deliver to the passenger during a flight on the aircraft based on the received objective and subjective passenger information. A service delivery device is identified among the service delivery devices of the aircraft that is associated with a seat assigned to the passenger or determined to be operated by the passenger. The controller controls delivery of the determined service to the identified service delivery device.

26 Claims, 5 Drawing Sheets

(51) Int. Cl.
*H04N 21/442*      (2011.01)
*H04N 21/4415*     (2011.01)
*H04N 21/466*      (2011.01)
*H04N 21/4227*     (2011.01)
*H04N 21/475*      (2011.01)
*H04N 21/45*       (2011.01)
*H04N 21/4223*     (2011.01)

(56) References Cited

U.S. PATENT DOCUMENTS

| | | | |
|---|---|---|---|
| 2007/0300265 A1* | 12/2007 | Karkkainen | H04N 21/4667 |
| | | | 725/62 |
| 2008/0133705 A1* | 6/2008 | Lemond | G06Q 30/04 |
| | | | 709/217 |
| 2010/0185625 A1* | 7/2010 | Johnson | G06Q 30/02 |
| | | | 707/748 |
| 2011/0153663 A1* | 6/2011 | Koren | G06F 16/903 |
| | | | 707/776 |
| 2011/0314502 A1* | 12/2011 | Levy | H04N 7/106 |
| | | | 725/46 |
| 2013/0066526 A1* | 3/2013 | Mondragon | G09G 5/00 |
| | | | 701/48 |
| 2014/0106333 A1* | 4/2014 | Dugan | B64D 47/02 |
| | | | 434/428 |
| 2017/0094356 A1* | 3/2017 | Mathews | H04L 51/22 |
| 2018/0181919 A1* | 6/2018 | Jobling | G06Q 10/025 |

\* cited by examiner

USER CENTRIC SERVICE AND CONTENT CURATION THROUGH IN-FLIGHT ENTERTAINMENT SYSTEM

CROSS REFERENCE

The present application claims priority to U.S. Provisional Application No. 62/459,861, filed Feb. 16, 2017.

TECHNICAL FIELD

Embodiments described herein relate generally to electronic entertainment systems and, more particularly, to in-flight entertainment systems for aircraft that control delivery of electronic content and services to passengers.

BACKGROUND

In-flight entertainment (IFE) systems are deployed onboard aircraft to provide entertainment for passengers in a passenger cabin. IFE systems typically provide passengers with television, movies, games, audio entertainment programming, and other electronic content.

IFE systems can provide video-on-demand services to passengers from a library of electronic content made available by the airline or an associated entity (i.e., a content service provider). Selection of content to be included or maintained within an IFE system can be a difficult but important process. Passenger satisfaction with a flight experience and, ultimately, with an airline can be significantly impacted by what content is made available through an IFE system.

Content is presently selected for IFE systems based on box office ratings, TV ratings, and "usage data" captured by IFE systems across a fleet of aircraft. Usage data indicates what content was used by passengers during earlier flights. Usage data can provide a relatively limited understanding of content usage, such as the number of times and duration content was viewed during various flights, and what particular content may be interesting to a particular passenger.

IFE systems are increasingly being used to provide an expanded set of services, beyond electronic content, to passengers. Existing IFE systems are unable to curate such content and services in a sufficiently user centric manner.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

SUMMARY

Figure 1:
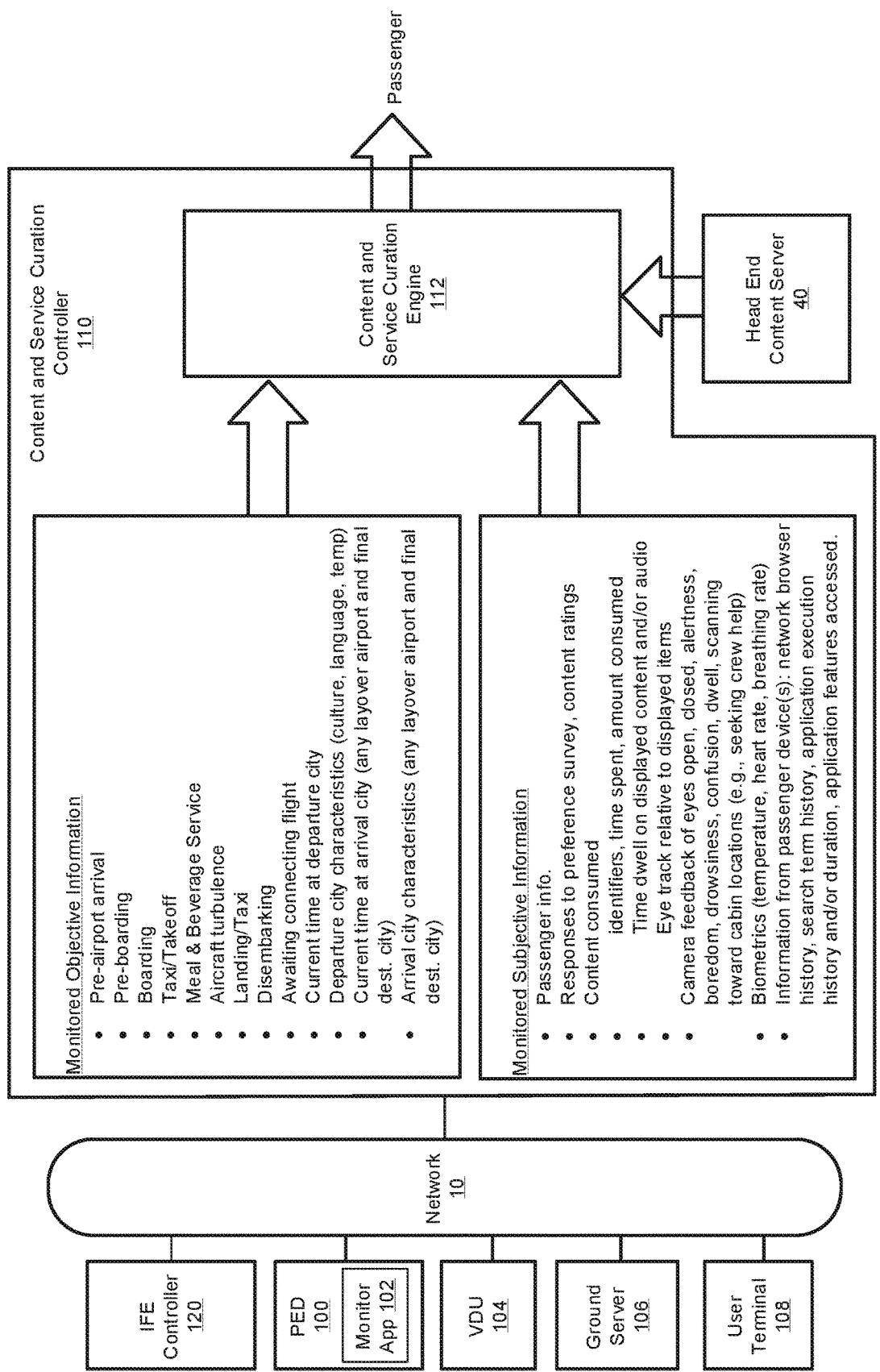
FIG. 1 illustrates a content and service curation controller receiving passenger objective and subjective information, and responsively providing individualized content curation to the passenger, according to some embodiments.

According to some embodiments of the present disclosure, a method performed by a controller device in communication with service delivery devices of an aircraft in-flight entertainment (IFE) system includes receiving objective information associated with an aircraft comprising the aircraft IFE system is described herein. The method also includes receiving subjective passenger information associated with a passenger of the aircraft. The method also includes determining a service to deliver to the passenger during a flight on the aircraft based on the received objective and subjective passenger information. The method also includes identifying a service delivery device among the service delivery devices of the aircraft that is associated with a seat assigned to the passenger or determined to be operated by the passenger. The method further includes controlling delivery of the determined service to the identified service delivery device.

In some other embodiments of the present disclosure, a system for controlling delivery of in-flight content and services to passengers of an aircraft, the system comprises an in-flight entertainment (IFE) system of the aircraft is described herein. The IFE system comprises a plurality of service delivery devices associated with passenger seats of the aircraft. The IFE system also comprises an IFE controller in communication with the plurality of service delivery devices and configured to deliver the in-flight content and services to the service delivery devices. The system further comprises a controller device in communication with the IFE system, the controller device configured to receive objective information associated with an aircraft comprising the aircraft IFE system. The controller device is also configured to receive subjective passenger information associated with a passenger of the aircraft. The controller device is also configured to determine a service to deliver to the passenger during a flight on the aircraft based on the received objective and subjective passenger information. The controller device is also configured to identify a service delivery device among the service delivery devices of the aircraft that is associated with a seat assigned to the passenger or determined to be operated by the passenger. The controller device is further configured to control delivery of the determined service to the identified service delivery device.

DETAILED DESCRIPTION

The following detailed description discloses various non-limiting example embodiments of the invention. The invention can be embodied in many different forms and is not to be construed as limited to the embodiments set forth herein.

Some embodiments of the present disclosure may arise from the present realization that selecting electronic content for curation to passengers based on generalized box office ratings, TV ratings, and "usage data" fails to address the substantial diversity of passenger preferences. Moreover, some embodiments arise from the present realization that selecting services to be offered to passengers based on generalized passenger surveys or feedback also fails to address the substantial diversity of passenger preferences. To overcome these and other problems, various embodiments of the present invention are directed to providing an IFE system that personalizes what electronic content and services are curated to a particular passenger based on a combination of objective information relating to the environment of a passenger and subjective information determined for the passenger through various monitoring and measurement systems associated with the IFE system. These determinations can be performed by various computer systems while the passenger is on-board and off-board the aircraft. The passenger information can be electronically determined based on what a passenger is doing or experiencing during micro-moments while planning a flight, traveling to an airport, waiting to board an aircraft, boarding an aircraft, and during defined phases of the flight. These and other embodiments are discussed in detail below.

FIG. 1 illustrates a content and service curation controller 110 that receives a myriad of different types of objective and subjective passenger information attributed to passenger identifiers, and which characterizes individual passengers and environmental parameters associated with those passengers. The content and service curation controller 110 combines the objective and subjective information for one of the passengers to generate content and/or service recommendation metrics, and responsively provides individualized electronic content curation and/or individualized service curation to that passenger.

The content and service curation controller 110 contains a content and service curation engine 112 that operates to combine the objective and subjective information and control what content and/or services are offered to a particular passenger for selection, control prioritization of how content and/or services are offered to a particular passenger for selection, and/or to control what content and/or services is automatically selected and provided to a particular passenger. The content and service curation engine 112 may operate to provide on-demand streaming and/or downloading (e.g., for remote execution) of electronic content, residing on a head end content server 40, to a passenger electronic device (PED) 100 and/or to a video display unit (VDU) 104 for selection among by an identified passenger. Alternatively, or additionally, the content and service curation engine 112 may provide to an IFE controller 120 a list of electronic content that is to be offered through, service delivery devices of the IFE system, such as a PED 100, a crew terminal, and/or through VDUs 104, to an identified passenger as on-demand streaming services and/or as downloading services. Example electronic content that can be downloaded from the head end content server 10 can include, but is not limited to, movies, television shows, audio programs (e.g., podcasts), music, application programs (e.g. games, news, etc.), informational videos and/or multimedia/textual descriptions (e.g., news, advertisements, and information related to inflight services, destination cites, destination related services, and products).

In some embodiments, the passenger information received by the content and service curation controller 110 can be generated by computers interacting with the passenger prior to the passengers arrival at an airport. In the example of FIG. 1, the content and service curation controller 110 can receive passenger information from a ground-based server 106 and/or from a user terminal 108. Although various embodiments of the content and service curation controller 110 are described in the context of residing on-board an aircraft, it is to be understood that various functionality described herein as being performed by the content and service curation controller 110 may alternatively or additionally be performed by a computer system that is off-board the aircraft. For example some or all of the functionality may be performed by the ground-based server 106 that is communicatively connected to the head end content server 40 onboard the aircraft.

Although embodiments herein are primarily described in the context of an IFE system within an aircraft cabin, the invention is not limited thereto. Instead, embodiments herein may be used to provide electronic content to other types of entertainment systems for trains, automobiles, cruise ships, buses, convention centers, sports arenas, business meeting rooms, home, and other environments. When used in an aircraft, a bus, a train, or other vehicle where seats are arranged in rows and columns, the VDUs 104 can be attached to seatbacks so they face passengers/users in adjacent rearward seats. The VDUs 104 may alternatively be mounted to bulkheads, movable support assemblies connected to seat armrests and/or seat frames, etc.

Pre-Flight Related Passenger Information Generation

The server 106 may be an Internet-based airline reservation server or other web server that a user interacts with through, e.g., the user terminal 108. A passenger is also interchangeably referred to as a user, such as before boarding when the user not yet a passenger on the airplane. The user terminal 108 may be a desktop computer, laptop computer, tablet computer, smart phone, or other electronic communication device operable by a user (passenger).

In some embodiments, the server 106 operates to obtain a user's trip schedule, including departure city, departure airport, connecting airport, destination airport, destination city, travel date and time schedule, and/or historical travel records related to the user. The server 106 may operate to obtain (e.g., query a passenger account, survey via a user interface) a user's electronic content consumption preferences (e.g., movie/TV genre, particular shows, games, etc.) and/or service consumption preferences, such as food preferences and/or restrictions, drink preferences and/or restrictions, and/or other information that a user provides which can be used by the content and service curation controller 110 to individually characterize a user. The server 106 may contain a repository that tracks and stores user information regarding what content and/or services the user has historically consumed and which may be further correlated with information defining characteristics of those flights, such as the departure and arrival cities, flight duration, flight delay, prior connecting flight delay, future connecting flight delay, departure location time of day, local time of day, destination location time of day, day of week, date, type of aircraft, etc.

In some further embodiments, the server 106 and/or the content and service curation controller 110 determines whether the user will be accompanied by another person during a scheduled trip, and estimates whether and what effect that may have on the user's electronic content consumption preferences and/or on the user's service consumption preferences during the scheduled trip. The server 106 and/or the content and service curation controller 110 can contain a repository that tracks and stores user information regarding who has accompanied the user on one or more earlier flights, and the relationship of that accompanying person to the user, such as among relationship categories of: colleague, family member, frequent traveler with the user, etc., and/or an identity of a particular person. The server 106 and/or the content and service curation controller 110 can identify a correlation between what content and/or services the passenger consumed during various identified flights and whether the passenger was accompanied, and estimate what effect being accompanied by a person falling with a particular category and/or by an identified person had on the passenger's historical content and/or services consumption choices. When estimating the effect on the passenger's content and/or services consumption choices, the server 106 and/or the controller 110 may further determine whether the effect selectively depends on whether the accompanying person was seated adjacent to or within a threshold row and/or column seat spacing of the passenger (i.e., were the passenger's content and/or services choices influenced by possible observation by the accompanying passenger). For example, the server 106 and/or the content curation controller 110 may contain or have access to a passenger manifest of a current flight or previous flights of the passenger to determine whether the accompanying person was seated adjacent to or within a threshold row and/or column seat spacing of the passenger during the current or previous flights.

The departure date-time weather, travel distance between the user's home address and departure airport, and other information related to the environment experienced by the user during a pre-flight phase can be determined by the server 106 and/or the content and service curation controller 110 for use by the content and service curation engine 112 in generating content and/or service recommendation metrics.

Delays that the user is presently experiencing awaiting boarding of a flight, which may include delays incurred by the user on one or more previous connecting flights, may be tracked and provided by the server 106 to the content and service curation controller 110 and/or maybe tracked by the controller 110 for use by the content and service curation engine 112.

In an embodiment, responsive to determining that the user is presently experiencing more than a first threshold delay awaiting boarding and/or take-off of a present flight and/or more than a second threshold delay incurred by the user on one or more previous connecting flights, the curation engine 112 identifies a premium service to offer as a complimentary service to the user during the flight based on the delay information and the user's content and/or service consumption on previous flights. The curation engine 112 can then responsively provide the offered premium service to the passenger.

For example, the curation engine 112 may identifying premium tier of movies or a premium tier of in-flight beverage service which a passenger would normally need to pay to access, but which is now offered as a complimentary (no charge) service to the user during the flight, responsive to the determined delay(s) exceed the first and/or second thresholds. The curation engine 112 may, for example, communicate with a content server and/or a VDU to unlock electronic content to make it available for selection by a passenger through the VDU. When the delay is associated with a present flight that affects all passengers or affects only a sub-group of passengers (e.g., who were on one or more earlier flights having excessive delays), the curation engine 112 may similarly unlock the electronic content for those passengers.

The content curation controller 110 may respond to a determination that turbulence experienced by the passenger exceeds a defined magnitude threshold over a defined duration threshold, by identifying a premium service to offer as a complimentary service to the passengers during the flight, and operate to provide the offer for selection by the passengers through a service delivery device.

Flight Related Passenger Information Generation

Figure 5:
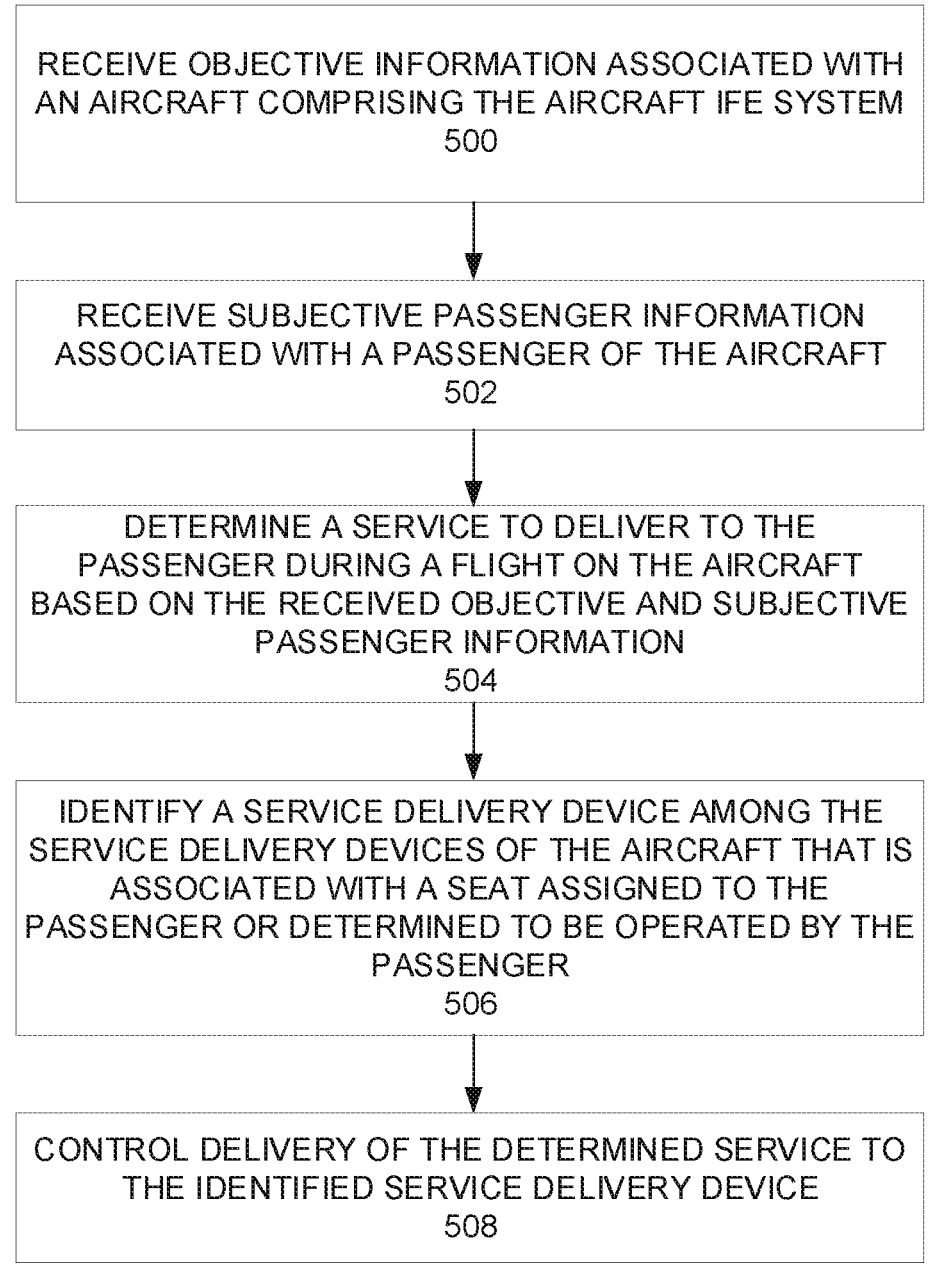
FIG. 5 illustrates a flow diagram of a method of controlling delivery of a service to a service delivery device according to some embodiments of the present disclosure.

FIG. 5 illustrates a method performed by a controller device in communication with service delivery devices of an aircraft in-flight entertainment (IFE) system includes receiving 500 objective information associated with an aircraft comprising the aircraft IFE system in accordance with embodiments of the present disclosure. FIG. 5 also illustrates, in accordance with embodiments, the method also includes receiving 502 subjective passenger information associated with a passenger of the aircraft. For example, the content and service curation controller 110 can monitor or obtain from other systems, objective information related to a passenger's trip and subjective information related to the passenger.

The method also includes determining 504 a service to deliver to the passenger during a flight on the aircraft based on the received objective and subjective passenger information as illustrated in FIG. 5 in accordance with embodiments. For example, the objective and subjective information can be provided to the content and service curation engine 112, which uses the information to generate passenger content and/or service recommendation metrics indicative of the passengers preferences and, responsive thereto, provides personalized content and/or services curation to that passenger. FIG. 1 further illustrates various types of objective and subjective information that can be used by the content and service curation engine 112, in accordance with some embodiments.

Referring to FIG. 1, objective information that can be used by the content and service curation engine 112 to control curation of content and/or services to a particular passenger can include, but is not limited to, any one or more of the following:

1. Pre-airport arrival events and/or other information affecting the (e.g., driving distance to departure airport, earlier connecting flight(s) information, etc.);
2) Pre-boarding events (e.g., elapsed time, delay, gate relocation, weather, geographic location) and/or other information occurring between airport arrival and departure which can affect the passenger;
3) Boarding events (e.g., elapsed time, delay, boarding group or sequence location, interruption/cancellation in boarding) and/or other information occurring between start of boarding and becoming seated, which can affect the passenger;
4) Taxi/Takeoff events (e.g., elapsed time, delay, weather, interruption/cancellation during taxi/takeoff) and/or other information occurring between gate departure and start of takeoff and/or between wheels-off-ground event and reaching cruising altitude, which can affect the passenger;
5) Meal and/or beverage service events (e.g., meal/beverage timing relative to boarding or other timing event, duration, delay relative to pre-defined time schedule, weather, interruption/cancellation) and/or other information which can affect the passenger;
6) Occurrence of turbulence events (e.g., duration, start time relative to boarding or other timing event, strength metric(s), number of events and elapsed time therebetween) and/or other information which can affect the passenger;
7) Landing and/or taxi events (e.g., elapsed time, delay, weather, interruption due to holding pattern and/or repeated landing attempt, rerouting to an airport other than intended destination) and/or other information occurring between initiating descent and wheels-on-ground event, which can affect the passenger;
8) Disembarking events (e.g., elapsed time, delay, disembarking sequence location) and/or other information occurring between landing and disembarking, which can affect the passenger;
9) Awaiting connecting flight events (e.g., arrival delay, elapsed time between arrival and departure, variation from scheduled layover duration) and/or other information occurring between arriving on earlier connecting flight and departure on next connecting flight, which can affect the passenger;

10) Current time at departure city, acclimated time zone of passenger, etc.;

11) Departure city characteristics, e.g., language, temperature, culture;

12) Current time at arrival city, e.g., at layover airport and/or final destination city;

13) Arrival city characteristics, e.g., language, temperature, culture.

With continuing reference to FIG. 1, subjective information that can be used by the content and service curation engine 112 to control curation of content and/or services to a particular passenger can include, but is not limited to, any one or more of the following:

1) Passenger information, e.g., frequent flyer information (recency of prior flight(s), pattern of prior flights relative to schedule and/or duration, departure and/or destination cities, airline(s), etc.), passenger home address, employer identity, age, gender, other passenger characteristics;

2) Passenger responses to one or more preference surveys, passenger generated satisfaction ratings for previously consumed (e.g., viewed, played, and/or downloaded) content and/or previously consumed or rejected service offerings through the user terminal 108 and the server 106, an onboard PED 100, an onboard VDU 104, and/or tracked by the content and service curation controller 110;

3) Content and/or services consumed during a flight, including content/service identifiers, time spent accessing the content, time spent using the service, and/or amount of the content and/or service consumed;

4) Eye tracking information (e.g., from seat mounted camera) tracking when and for how long passenger is looking at content and/or looking at a description or indicia representing a service offering, and/or where and for how long passenger is looking at particular items displayed with or within content (e.g., product placement, advertisements, etc.);

5) Camera information containing video of passenger's eyes, which is processed to determine using defined rules when and for how long a passenger appears alert, sleeping, bored, drowsy, confused, and/or scanning towards crew cabin locations (e.g., appearing to seek crew help);

6) Passenger biometrics, which may include body temperature, heart rate, and/or breathing rate.

In some further embodiments, the subjective information can be obtained from the passenger's PED 100, such as by a monitoring application 102, which may be an airline sponsored application, that is executed by the PFD 100. The monitoring application 102 may operate to record and/or characterize defined types of user interactions with the application 102, such as by recording and/or generating metrics characterizing network browser history, search term history, application execution frequency and/or duration, and/or application features accessed.

The monitoring application 102 may alternatively or additionally monitor operation of one or more other applications that are executed by the PED 100 concurrently with the monitoring application 102. For example, the monitoring application 102 may include an application wrapper that intercepts and/or otherwise electronically observes application programming interface (API) calls by the one or more other applications to an operating system of the PED 100 and/or to another application. Through monitoring of the API calls the monitoring application 102 can obtain, record and/or characterize defined types of user interactions with each of the one or more other applications, such as by recording and/or generating metrics characterizing network browser history, search term history, application execution frequency and/or duration, and/or application features accessed.

The monitoring application 102 may obtain subjective information for the passenger using APIs of other applications hosted on the passenger's PED 100. For example, the monitoring application 102 may perform a function call to an API of the Safari-brand web browser to obtain the passenger's network browser history, may perform a function call to an API of a media player application (e.g., streaming service player, e-book reader, etc.) to obtain the passenger's content consumption history, and/or may perform a function call to an API of a gaming application to obtain the passenger's game character definition (e.g., avatar characteristics) and/or other defined preferences or settings.

The monitoring application 102 may alternatively or additionally access a passenger's social media account through one or more APIs of a social media application on the passenger's PED 100, to obtain subjective information regarding the passenger that can be used by the content and service curation engine 112 to generate the content and/or service recommendation metrics.

In another embodiment, the content and service curation engine 112 directly or indirectly monitors network communications between the PED 100 and the IFE controller 120 through an on-board component of the network 10, and/or monitors network communications between the PED 100 and one or more other PEDs 100 through the on-board component of the network 10.

The content and service curation controller 110 may obtain passenger biometrics through electronic communications with passenger worn devices (e.g., fitness devices), passenger carried devices (e.g., fitness application on PED 100), and/or sensors connected to the passenger's seat.

IFE System with User Centric Content and Service Curation

Figure 2:
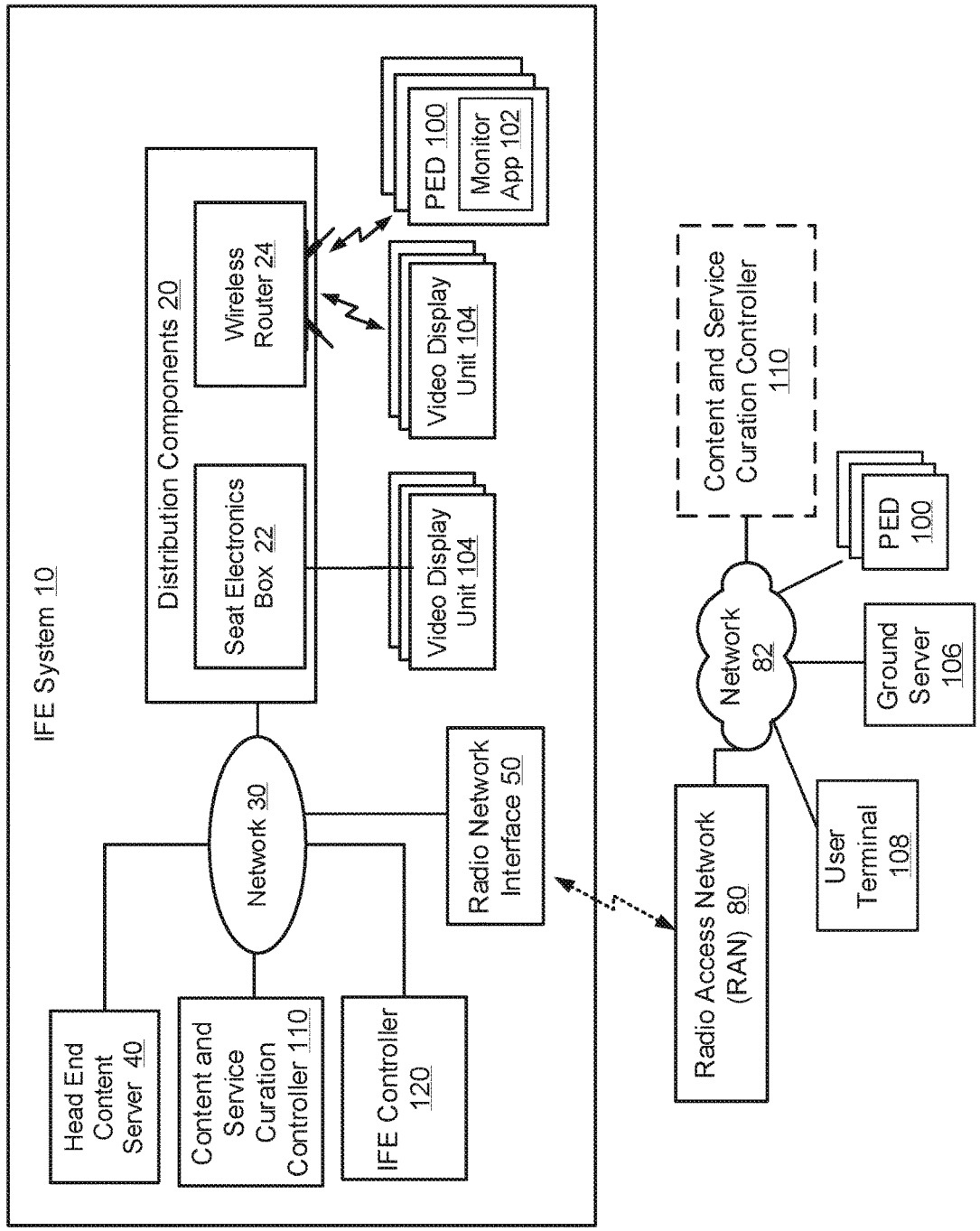
FIG. 2 is a block diagram of an IFE system configured according to some embodiments.

In accordance with embodiments, FIG. 5 illustrates the method also includes identifying 506 a service delivery device among the service delivery devices of the aircraft that is associated with a seat assigned to the passenger or determined to be operated by the passenger. For example, FIG. 2 is a block diagram of an IFE system 10 that includes service delivery devices, such as VDUs 104, the head end content server 40, the content and service curation controller 110, the IFE controller 120, and additional service delivery devices, such as data traffic distribution components 20. The distribution components 20 communicatively connect service delivery devices, such as the VDUs 104 and PEDs 100, to other components of the IFE system 10. Off-board computer systems, such as the user terminal 108, the server 106, and/or the PED(s) 100 can communicate through a ground-based network 82 (e.g., Internet and/or private network) and one or more radio access networks (RANs) 80 with the IFE system 10 through a radio network interface 50. The RAN(s) 80 and radio network interface 50 may communicate via ground-based radio transceiver stations (e.g., cellular radio base stations) and/or via satellite-based radio transceivers. As explained above, the content and service curation controller 110 receives passenger information (including the objective and subjective information described herein) from the VDUs 104, the PEDs 100, the user terminal 108, and/or the server 106.

Although FIG. 2 shows a centralized content and service curation controller 110 that controls curation of content and services to seats in the aircraft, some or all of the functionality disclosed herein for the content and service curation controller 110 may be at least partially integrated within seat located components, such as within video display units 104 located in seatbacks, armrests, etc.

The head end content server 40 stores a set of electronic content and is configured cooperation with the IFE controller 120 to separately and selectively deliver electronic content to a specified service delivery device, such as one or more of the VDUs 104 and/or the PEDs 100 responsive to content selection commands separately received from the VDUs 104 and/or the PEDs 100. The distribution components 20 may include additional service delivery devices, such as seat electronics boxes 22, each of which can be spaced apart adjacent to different groups of seats, and/or one or more wireless communication routers 24.

Example content that can be downloaded from the head end content server 40 can include, but is not limited to, movies, TV shows, audio programs, application programs (e.g. games, news, etc.), informational videos and/or multimedia/textual descriptions (e.g., news, advertisements, and information related to inflight services, destination cites, destination related services, and products). The wireless router 24 may be a WLAN router (e.g. IEEE 802.11, WIMAX, etc.), a cellular-based network (e.g. a pico cell radio base station), etc.

The VDUs 104 and PEDs 100 are connected to the IFE controller 120 and the head end content server 40, and operate to request and receive content through wired and/or wireless network connections through the network 30 and/or the distribution components 20. Any number of VDUs 104, PEDs 100, and content servers 40 may be used with embodiments herein. Although the content and service curation controller 110 is illustrated in FIG. 2 as being separate from the IFE controller 120, the functionality described herein for the content and service curation controller 110 may alternatively or additionally be performed by the IFE controller 120. Moreover, some or all of the functionality described herein as being performed by the content and service curation controller 110 may be performed by a ground-based content and service curation controller 110 that communicates with the IFE system through the RANs 80.

Although the system 10 of FIG. 2 includes a head end content server 40, other embodiments may not have a head end content server 40 that is separate from the VDUs 104 and/or the PEDs 100. In other words, the VDUs 104 and/or the PEDs 100 may be configured to store content in internal/local mass memory for access by users and/or may stream and/or download content from other devices, such as from other VDUs 104 and/or PEDs 100 (e.g., peer-to-peer sharing) and/or from off-board devices such as the server 106 via the RAN 80.

User Centric Content and Service Curation

Referring to FIG. 5, the method also includes controlling 508 delivery of the determined service to the identified service delivery device in accordance with embodiments. For example, the content and service curation controller 110 is configured to curate what electronic content is offered or provided to a particular user based on the monitored passenger objective and subjective information.

In some embodiments, the content and service curation controller 110 uses the monitored passenger objective and subjective information to select and/or prioritize among the available movies, TV shows, audio programs, application programs (e.g. games, news, etc.), informational videos and/or multimedia/textual descriptions (e.g., news, advertisements, and information related to inflight services, destination cites, destination related services, and products), which resides in the head end content server 40 and/or the ground server 106, for curation to the passenger. For example, the content and service curation controller 110 can identify patterns of use and/or infer preferences based on the monitored passenger objective and subjective information to identify electronic content, such as games/movies/TV shows/etc. and/or a more general genre or other characteristics of games/movies/TV shows/etc. that a passenger may prefer. A listing of the identified electronic content can be displayed to the passenger via a service delivery device, such as the video display unit 104 and/or the PED 100 associated with the passenger.

The content and service curation controller 110 can additionally or alternatively be configured to curate what services are offered or provided to a particular user and based on the monitored passenger objective and subjective information.

In some embodiments, the content and service curation controller 110 uses the monitored passenger objective and subjective information to select and/or prioritize among the various defined services that can be offered or otherwise provided to the passenger. For example, the content and service curation controller 110 can identify patterns of use and/or infer preferences based on the monitored passenger objective and subjective information to identify meal items, timing for meal offerings, drink items, timing for drink offerings, and/or shopping product items. The content and service curation controller 110 may initiate such service offerings by controlling the display of associated information via a service delivery device, such as the video display unit 104 and/or the PED 100 associated with the passenger, and/or by communicating one or more messages to a crew terminal that is on-board the aircraft to notify a crew member of the service recommendation.

In some further embodiments, the content and service curation controller 110 uses the monitored passenger objective and subjective information to control various types of service interactions with a passenger and associated service delivery devices. For example, the controller 110 can electronically control service delivery devices such as: motors/actuators of a physical massage mechanism within the passenger's seat; electronically control a temperature control mechanism, such as a heating and/or cooling mechanism, within the passenger's seat and/or that controls airflow directed to the passenger, and/or ambient temperature near the passenger; electronically control an ambient lighting circuit to control an ambient lighting intensity provided to the passenger; electronically control a window shade position mechanism (e.g., motor connected to raise and lower the window shade) to control a height position of a window shade adjacent the passenger; generate and communicate notification messaging to one or more crew terminals indicating food and/or drink preferences of the passenger; and/or generate and communicate notification messaging to one or more crew terminals of the timing preferences for service of food and/or drink to the passenger.

As an example, the controller 110 may electronically control a service delivery device, such as a window shade position mechanism of a window shade adjacent to the passenger, responsive to determining the passenger is experiencing turbulence of the aircraft during the flight. The controller 110 may electronically control the window shade position mechanism to raise a height of the window shade adjacent to the passenger, to allow-in more natural sunlight and allow the passenger to see outside to provide an observable frame of reference outside the cabin and counteract discomfort and potential nausea, responsive to determining presence of a threshold level of airplane turbulence for at least a threshold duration. The window shade height may be increased responsive to increased magnitude of turbulence and/or increased duration of turbulence, and may be lowered responsive to identifying decreased magnitude turbulence or cessation of turbulence. In an embodiment, the controller 110 may determine to raise or lower the height of the window shade based on one of a preference of the passenger or information indicating an identified passenger is sensitive to turbulence during flight, and responsive thereto can selectively raise only window shades that are adjacent to such turbulence sensitive passenger(s) while leaving the non-adjacent window shades with unchanged height or also change the height of the non-adjacent window shades but to a lesser extent than for those adjacent to turbulence sensitive passenger(s). In another embodiment, the controller 110 may electronically control the window shade position mechanism to either lower or raise the height of the window shade based on a duration or frequency of turbulence during the flight. For example, the controller 110 may control electronically control the window shade position mechanism to raise the height of the window shade adjacent to the passenger and maintain the raised height while the turbulence is determined to be occurring frequently (satisfying a defined rule) during the flight.

In another example, the controller 110 may electronically control a service delivery device, such as a temperature control mechanism, to control an ambient temperature and/or airflow to the passenger during turbulence on the flight (e.g., control a regulated vent directed to a particular passenger seat, a group of regulated vents directed to a group of passenger seats, and/or a blower circulating air to a region of a cabin). In an embodiment, the controller 110 may electronically control the temperature mechanism to raise or lower the ambient temperature surrounding the passenger and/or increase or decrease the airflow provided to the passenger based on one of a preference of the passenger or information indicating the passenger is sensitive to turbulence during flight. In another embodiment, the controller 110 may electronically control the temperature mechanism to raise or lower the ambient temperature surrounding the passenger and/or increase or decrease the airflow provided to the passenger based on a duration or frequency of turbulence during the flight. For example, the controller 110 may control electronically the temperature control mechanism to lower the ambient temperature surrounding the passenger and/or increase airflow to the passenger while at least a threshold level of turbulence is occurring over at least a threshold duration during the flight.

Example Destination and Profile Focused User Centric Content and Service Curation Via the IFE System Further example operations are explained below which can be performed by the content and service curation controller 110 to curate content and services to a passenger based on the passenger's flight destination and certain objective and subjective information determined for that passenger. The controller 110 accesses the server 40 and/or another component of the system 10 to perform defined determination operations. The controller 110 can determine that the passenger is on a transatlantic trip with a final destination of Paris, France, and can determine the passenger's age, gender, and historical travel patterns. The determined results are used as baseline inputs to drive what content and/or service recommendations are made by the controller 110 for the passenger. The controller 110 determines the passenger's historical usage patterns of content and/or services provided via the IFE system 10, and determines additional passenger preferences which may have been defined by the passenger or determined through accessing application programming interfaces (APIs) of applications on the passenger's PED 100. These determinations are used as further baseline inputs to drive content and/or service recommendations by the controller 110 for the passenger.

The controller 110 can determine from the retrieved historical travel patterns that the passenger has not been to Paris before the present trip. The retrieved passenger preferences indicate to the controller 110 that the passenger has a preference for media associated with Woody Allen, and that the passenger has an interest in leisure, dining, and sightseeing during the present trip.

The controller 110 processes these baseline inputs, including the determination of the passenger's first time leisure based travel to Paris, to offer a destination-curated experience across the entertainment content, information content, and shopping items it offers through display to the passenger or prioritizes for display among a list of offers to the passenger. The baseline inputs further cause the controller 110 to recommend to the passenger, destination themed meals and drinks that are customized for the passenger based on past meal and drink consumption determined for the passenger. The controller 110 recommends one or more movies, such as "Midnight in Paris" using a preference for Woody Allen and Paris as a destination, and accesses a repository of destination related information to suggest places that are recommended for the passenger to visit based on the passenger's travel intent, preferences, age, and/or gender profile. The controller 110 may additionally display information to the passenger that suggests places to eat out, and may offer the passenger an opportunity to book a table now. Responsive to receiving requested booking information from the passenger, the controller 110 can communicate through the radio network interface 50 with a ground-based booking server to attempt to provide the requested booking.

Example Circadian and Wellness Service Coaching Via the IFE System

Further example operations are explained below which can be performed by the content and service curation controller 110 to provide circadian and wellness service coaching via the IFE system 10 based on the monitored passenger objective and subjective information.

The controller 110 may connect through a wireless communication interface (e.g., a Bluetooth interface, WiFi interface, or other RF interface) with a personal monitoring device of the passenger. The personal monitor device may be a phone, smart watch, fitness tracker, or other electronic device that provides one or more of the passenger monitoring functions described herein. The controller 110 may obtain the passenger's sleep data from the personal monitoring device. The controller 110 may alternatively or additionally be connected to in-seat sensors, that monitor the passenger respiration rate, physical movement, temperature, and/or other biometric data that are used to determine the passenger's sleep data. The controller 110 may determine from the passenger's sleep data the passenger's alertness state (e.g., awake, asleep, drowsy, alert, physically moving), the elapsed time being alert since last sleep occurrence, the elapsed time being asleep, historical sleep pattern, etc.

The controller 110 processes the passenger's sleep data, time zone of departure, time zone of destination, flight duration, previous and future connecting flight durations, etc., to generate suggest personalized resting periods during a present flight. The controller 110 can generate reminders to the passenger to initiate optimal resting periods, which may be displayed and/or audibly announced as notifications to the passenger through the video display unit 104 and/or the PFD 100 associated with the passenger.

The controller 110 may provide a customized rest period mode to the passenger which includes controlling timing for automatically changing seat position for the passenger (e.g., recline backward for sleep and rest, recline forward for waking and increasing alertness), controlling ambient lighting in an immediate area of the passenger (e.g., decrease lighting for sleep and rest, increase lighting for waking and increasing alertness), controlling cabin temperature and humidity, e.g., through controllable vents, in an immediate area of the passenger (e.g., decrease temperature and humidity for sleep and rest, increase temperature and humidity for waking and increasing alertness).

In an embodiment, the controller 110 may electronically control an ambient lighting circuit associated with a seat of the passenger to decrease lighting or increase lighting over a period of time. The ambient lighting circuit may comprise an electronically controlled variable lighting device configured to provide various intensities of light to the passenger. For example, the controller 110 may electronically control the ambient lighting circuit to decrease lighting over a period of time to encourage the passenger to rest or increase lighting over a period of time to gradually awaken the passenger. In an embodiment, the controller 110 may electronically control a seat position mechanism of the seat to change a seat position of the seat gradually over a period of time. For example, the controller 110 may electronically control the seat position mechanism to recline backward the passenger seat over a period of time to encourage the passenger to rest or recline forward the seat over a period of time to gradually awaken the passenger. The controller 110 may determine the timing for controlling the ambient lighting circuit and/or the seat position mechanism based on the subjective information and/or the objective information. For example, the timing may be controlled based on advancing in time or delaying in time adjustments that are triggered by timing events that track stages of an airline flight leg, such as time since takeoff, time since reaching a threshold altitude, time since leveling off at cruising altitude, remaining time before descent to landing, remaining time before reaching destination, time of day at departure city, time of day at destination city, and/or local time of day at present location of aircraft.

The customized rest period mode may additionally or alternatively include controlling timing for playing audio and visual relaxation related content to encourage the passenger's sleep or rest, and include controlling timing for playing audio and visual increased alertness related content to encourage the passenger's waking or increased alertness. The controller 110 may wake the passenger by initiating curation of a wake-up sequence of actions when the controller 110 determines that the passenger remains asleep after the end of the customized rest period has been reached. The curated wake-up sequence can include the controller 110 controlling a combination of haptic feedback to the passenger (e.g., force and/or vibration apparatuses in the seat), controlling recline angle of the seat, controlling ambient lighting, controlling ambient temperature and/or humidity, controlling seat temperature, and/or controlling introduction of smells into the air provided to the passenger.

The controller 110 may communicate the passenger's sleep data to a crew terminal, which may track how many passengers are resting and optimize their service schedule accordingly. The controller 110 may notify the crew via the crew terminal when the passenger is sensed to be waking and may notify the crew of a recommended wake-up drink and/or food selection for the passenger.

In some embodiments, the controller 110 coaches a passenger as to when and how often to get out of a seat for exercise or other movement, and/or when and how often to perform exercise while seated. The controller 110 can be configured to track how long a passenger has remained seated by, for example, tracking how long the personal monitor device has remained present at the seat, such as how long the personal monitor device has remained within communication range of a short range communication transceiver associated with the passenger's seat and which is communicatively connected to the content and service curation controller 110. The transceiver may be within a video display unit 104 mounted in a seatback of a seat forward of the passenger's seat, in an armrest of the passenger's seat, etc.

The transceiver may track change in the received signal strength of signals received from the personal monitor device to determine when the passenger has left the seat, such as based on determining that the received signal strength has dropped below a defined threshold value for at least a threshold time. For example, when the passenger leaves the seat with the personal monitor device (e.g., wearing the smart watch or fitness tracker) to walk down an aisle for exercise or to use an airplane facility or service, the controller 110 can identify occurrence of that event responsive to observing declining received signal strength measurements from the transceiver and/or responsive to identifying loss of a communication connection between the transceiver (e.g., short range Bluetooth transceiver) and the personal monitor device.

The controller 110 may generate a notification to a passenger of a recommended action to leave the seat for exercise or other movement (e.g., display information and/or generate an audible or tactile notification) responsive to determining the passenger has remained seated more than a recommended threshold time. The controller 110 may adjust the threshold time or control other timing for delivering the notification based on the sleep data and/or other monitored passenger information (e.g., the passenger is presently eating, watching a movie or television show having less than a threshold remaining duration, etc.)

During a power calibration phase (e.g., during initial pairing or registration) while the passenger is seated in close proximity to the transceiver, the controller 110 may operate to control the personal monitor device to transmit with no more than a defined transmit power level (e.g., a lowest power level that can be transmitted by the personal monitor device) and/or at a lowest power level that provides a threshold level of received signal quality (e.g., bit error rate) for signals received by the transceiver. Minimizing the transmission power level of the personal monitor device can increase the accuracy with which the controller 110 can track when and for how long the passenger is away from the seat.

Other transceivers located at other seats in the aircraft and which are communicatively connected to the content and service curation controller 120, may track movement of the passenger along with movement of other passengers past rows and aisles of seats in the aircraft through discovering presence of the personal monitor device associated with the passenger and other personal monitor devices associated with the other passengers. The transceivers may report to the content and service curation controller 110 a list of device identifiers (e.g., Bluetooth ID, WiFi, ID, etc.) of personal monitor devices that have become discovered and/or that are no longer discoverable during a reporting period. The controller 110 can match the reported identifiers to individual passengers based on a cross-reference repository that may be generated during registration of personal monitor devices by passengers, e.g., when a passenger logs-in or registers a passenger monitor device to the IFE system 10 to obtain IFE service. The cross-reference repository may alternatively or additionally be generated by recording device identifiers that are reported by transceivers as being observed for at least a threshold time as being discoverable by the identified transceivers. The repository may map the device identifiers to seat identifiers, passenger identifiers, and/or transceiver identifiers.

Example Focused Curation of Meal Service, Drink Service and Shopping Service

Further example operations are explained below which can be performed by the content and service curation controller 110 to control curation of meal service, drink service, and/or shopping service to a passenger based on the monitored passenger objective and subjective information.

The controller 110 determines that the passenger's past drink consumption pattern indicates a preference for Chardonnay, and responsively displays (e.g., through the video display unit 104 and/or the PED 100) to the passenger a user-selectable offer for Chardonnay or priorities Chardonnay among a list of drink choices offered to the passenger. The controller 110 may communicate the drink preference of the passenger to the crew terminal to provide assistance to a crew member providing a user-centric experience for the passenger.

Responsive to the passenger ordering Chardonnay through the IFE or via a crew member, the controller 110 receives a notification of the order and updates the passenger information to record the preference. The controller 110 may also responsively displays information (e.g., a video or textual information) that has been defined as being logically associated with Chardonnay, such an information video showing where the Chardonnay was grown, made, or history of that type of wine.

The controller 110 also offers the passenger meal options that are selected based on defined pairing information as being recommended to the type of drink (Chardonnay) selected by the passenger and based on meal preferences and/or passenger profile information defined by or determined based on the objective and subjective passenger information.

A sensor may be located at the seat and configured to sense when the drink is low or empty. The controller 110 is communicatively connected to the sensor to monitor the drink level status, and to generate a drink refill action notification to a crew member responsive to determining the drink level as become low or empty. The sensor may be an infrared transmitter and receiver pair that are located within a drink holder recessed area in the passenger's tray table and/or the passenger's armrest, and which are configured to monitor a fluid level in a cup residing in the recessed area. Alternatively, the sensor may be camera that is configured to observe the cup and determine a fluid level therein.

The controller 110 may receive a passenger's rating of the drink and/or food, and responsively update the objective and subjective passenger information. The controller 110 may select among available items and/or prioritize the items that are offered for sale to the passenger via the video display unit 104 and/or the PED 100. For example, the controller 110 may offer to sell a bottle of the Chardonnay from the same vineyard as the drink provided to the passenger or from another vineyard known to provide a similarly Chardonnay.

Passenger Content and Service Recommendation Metrics Generator

The monitored passenger objective and subjective information can be combined in any manner to generate passenger content and service recommendation metrics, which are used to curate electronic content and/or services to the particular passenger. In some embodiments, the monitored passenger objective and subjective information is processed through a rules based engine to select among available electronic content and/or services that are offered and/or provided to the passenger.

The controller 110 may identify logical threads through events identified monitored passenger objective and subjective information, such as by identifying a sequence of events that has occurred and a frequency of occurrence for the passenger. For example, the controller 110 may identify a thread which tracks what genre of movies the passenger typically browses first, followed by which other genre, and so on. The controller 110 may further identify a thread for a timeline for other observable events that passenger performs (e.g., requests a drink and then waits for meal delivery before starting browsing of movies), and may track how long the passenger performs those events. For example, a thread may be developed that tracks how long the passenger dwelled within each genre during browsing. The controller 110 may use the logical threads as further inputs that drive its select among available electronic content and/or services that are offered and/or provided to the passenger, and/or to control timing of such offering or provision to the passenger.

In some other embodiments, the monitored passenger objective and subjective information is processed through a weighted combining process, such as will be described below with regard to the non-limiting example embodiment of FIG. 3. The weighted combining can include defining rules that apply to different weights to affect the influence of some fields of the monitored passenger objective and subjective information on what recommendations are made as to recommending among available electronic content, services, and/or timing of delivery of the electronic content and/or services.

Figure 3:
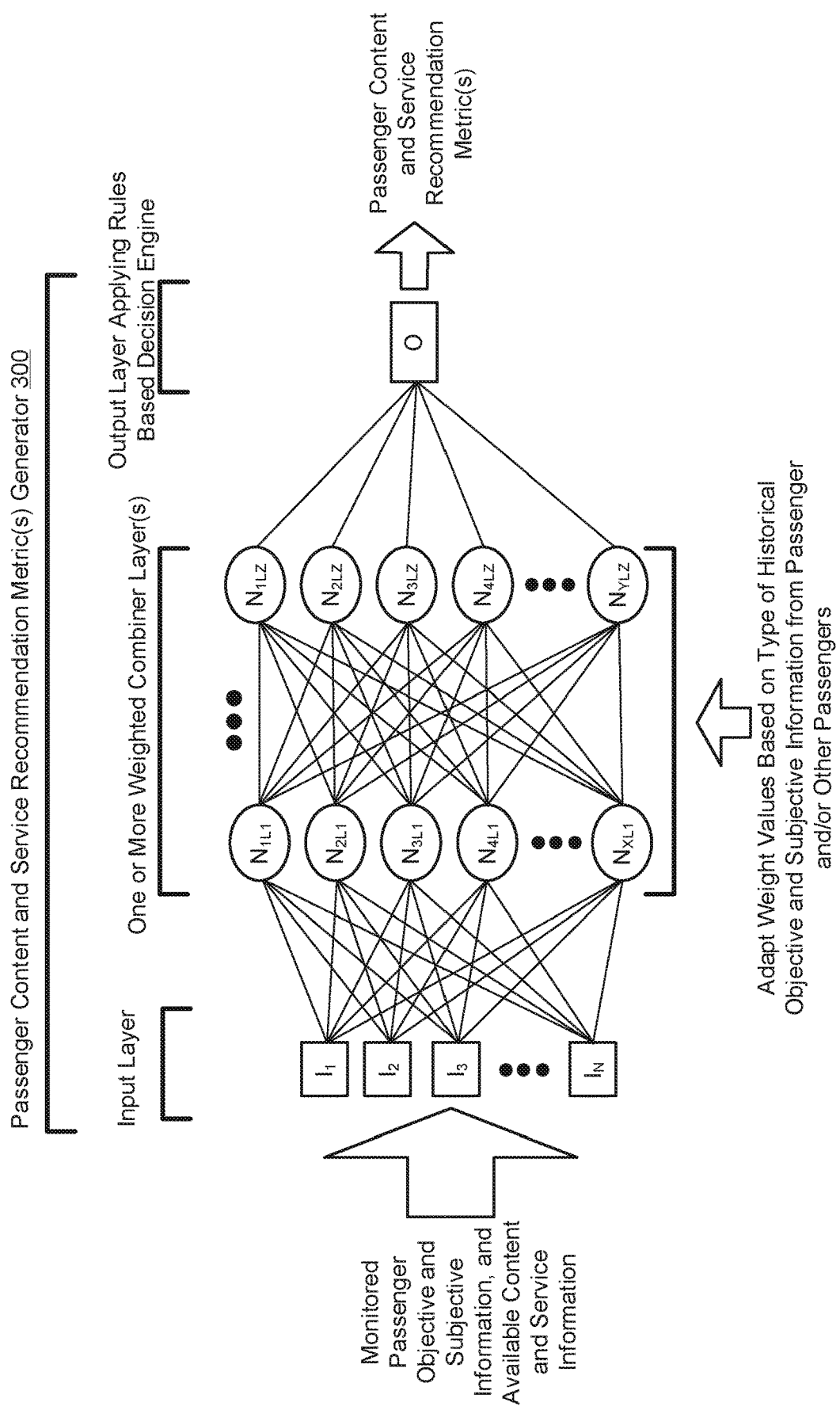
FIG. 3 illustrates a passenger content recommendation metrics generator configured according to some embodiments.

FIG. 3 illustrates a passenger content and services recommendation metric(s) generator 300 configured according to some embodiments. Referring to FIG. 3, the generator 300 includes an input layer having a plurality of input nodes, one or more weighted combiner layers with each including a plurality of weight nodes, and an output layer. Objective information and subjective information obtained for a particular passenger is provided to the input layer. In some embodiments, information which identifies what content and/or services are available to be curated, may also be provided to the input layer. The input information is combined through the one or more weighted combiner layers. Output of the one or more weighted combiner layers is provided to the output layer, which applies a rules-based decision engine to generate passenger content and service recommendation metrics.

In the particular non-limiting example of FIG. 3, the input layer includes input nodes 11 to IN (where N is any plural integer). A first one of the combiner layers includes weight nodes $N_{1L1}$ (where "1L1" refers to a first weight node on layer one) to $N_{XL1}$ (where X is any plural integer). A last one ("Z") of the sequence of combiner layers includes weight nodes $N_{1LZ}$ (where Z is any plural integer) to $N_{YLZ}$ (where Y is any plural integer). The output layer includes an output node O.

The generator 300 of FIG. 3 is an example that has been provided for ease of illustration and explanation of one approach for generating passenger content and service recommendation metrics based on mathematical combinations of a diverse set of types of and subjective information relating to a passenger, and perhaps relating to other passengers and/or available content and service that can be curated to the passenger(s). Other embodiments may include any non-zero number of input layers having any non-zero number of input nodes, any non-zero number of combiner layers having a plural number of weight nodes, and any non-zero number of output layers. The number of input nodes can be selected based on the number of Information items that are to be simultaneously processed to generate the passenger content and service recommendation metrics. The number of output nodes can be similarly selected based on the number of passenger content and service recommendation metrics that are to be simultaneously generated therefrom.

The generator 300 can be operated to process a plurality of information items through different inputs (e.g., input nodes 11 to IN) to generate passenger content and service recommendation metrics therefrom. The generator 300 may be operated to simultaneously process information items of a group of passengers through different inputs nodes, so that the information items of any one of the passengers of the group can influence the passenger content and service recommendation metrics provided for other ones of the passengers of the group. The amount of influence of one passenger's preferences on another the resulting passenger content and service recommendation metrics generated for another passenger, can be controlled through adjustment of the weight values used by the weight nodes for the combiner layers.

The weight nodes of the first one of the combiner layers mathematically combine values (e.g., weighted scaling of the result of combining the input values) of each of the input information items to generate weighted output values. When there is a single combiner layer, the weighted output values of that layer are provided to the output layer for processing to generate the passenger content and service recommendation metrics. In contrast, when there is more than one combiner layer connected in a sequence, the weighted output values of one combiner layer are output to all of the inputs of the weight nodes of a next one of the combiner layers in the sequence. The output layer receives the weighted output values from the last one of the one or more combiner layers, and applies a rules-based decision engine to generate the passenger content and service recommendation metrics.

In one embodiment, the rules-based decision engine compares similarity of a pattern of the values output by the weight nodes to a predefined group of patterns of values. Each member of the predefined group can be associated with a different set of content and service recommendation metrics. The decision engine identifies a closest matching one of the patterns in the predefined group to the pattern of values received from the weight nodes, and selects the corresponding set of content and service recommendation metrics.

The content and service recommendation metrics can identify or be used to define prioritization among available movies, TV shows, audio programs, application programs (e.g. games, news, etc.), informational videos and/or multimedia/textual descriptions (e.g., news, advertisements, and information related to inflight services, destination cites, destination related services, and products) for curate and to the passenger. For example, each of the predefined patterns may identify particular games/movies/TV shows/etc. and/or a more general genre or other characteristics of games/movies/TV shows/etc. that a passenger prefers.

Alternatively or additionally, the content and service recommendation metrics can identify or be used to define prioritization among meal selection items, meal timing, drink selection items, drink timing, and shopping product items.

The weight values used by the one or more combiner layers can be adapted (modified) based on feedback of historical preferences information that has been learned as to what identified content the passenger or a group of passengers previously consumed through one or more IFE systems. Alternatively or additionally, the weight values used by the one or more combiner layers can be adapted (modified) based on feedback of historical preferences information that has been learned as to what services the passenger or a group of passengers previously consumed, rejected, or expressed a desire or lack of desire to be again offered, when offered through IFE system or by a crew member.

The passenger content and service recommendation metrics are used by the content creation controller 110 and/or the IFE controller 120 to control what content and/or services are offered to the particular passenger, how content is prioritized for display to the particular passenger, filter what content is allowed to be selected by the particular passenger, how services are selected and/or prioritized for offering to the particular passenger, and/or filter what services are offered to the particular passenger through the IFE system or by a crew member responsive to a notification message received from the IFE system.

In some further embodiments, the passenger content and service recommendation metrics are used to control various types of service interactions with a passenger. For example, the passenger content recommendation metrics can be used to electronically control a physical massage mechanism within the passenger's seat, electronically control a heating and/or cooling mechanism within the passenger's seat, electronically control ambient lighting provided to the passenger, electronically control a window shade adjacent the passenger, generate and communicate notification messaging to one or more crew terminals indicating food and/or drink preferences of the passenger, and/or generate and communicate notification messaging to one or more crew terminals of the timing preferences for service of food and/or drink to the passenger.

Example Content and Service Curation Controller

Figure 4:
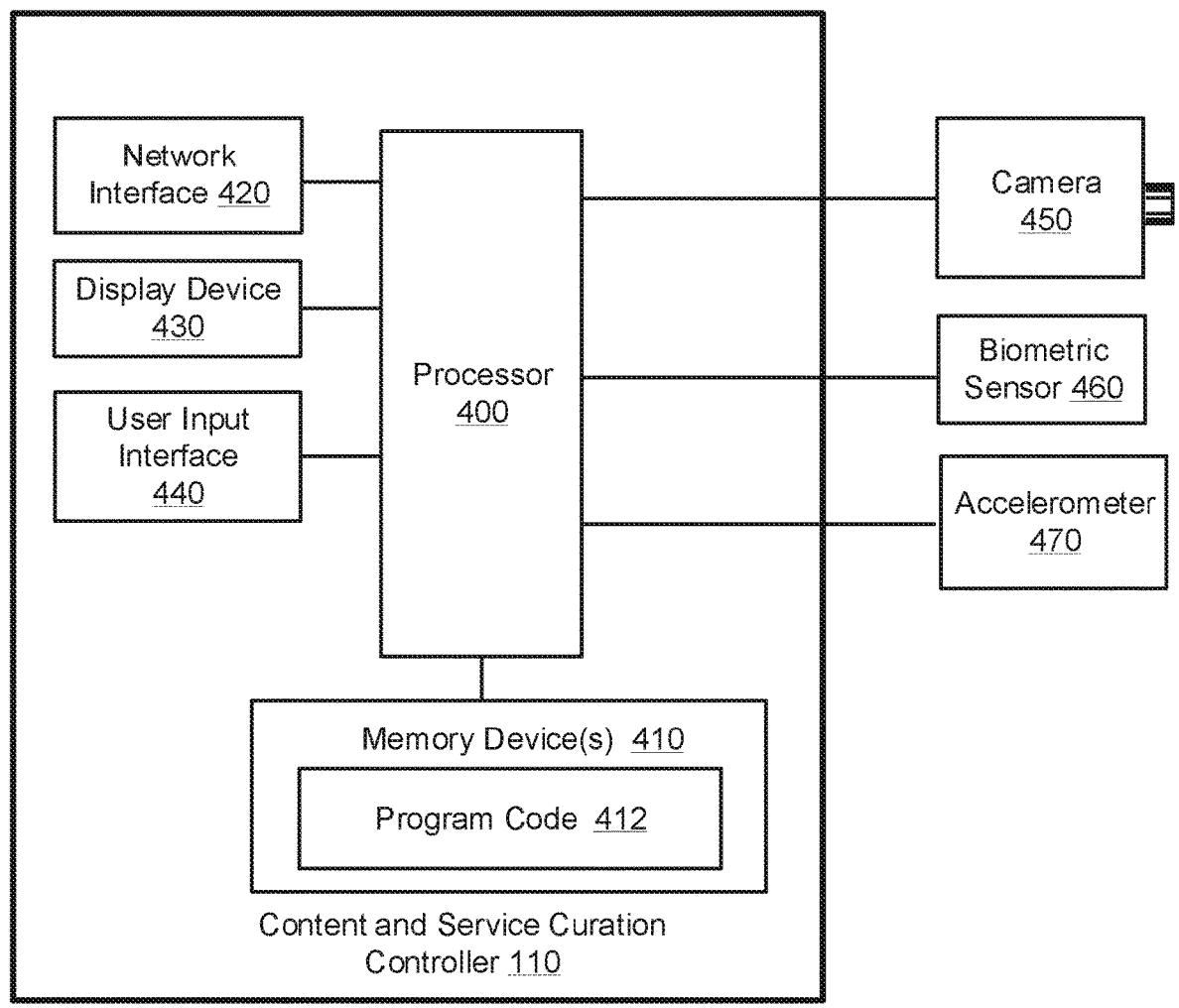
FIG. 4 illustrates a block diagram of a content and service curation controller configured according to some embodiments.

FIG. 4 is a block diagram of components that may be included in the content and service curation controller 110 configured to operate according to some embodiments. The content and service curation controller 110 includes a processor 400, a memory 410 containing program code 412, and a network interface 420. The processor 400 includes one or more data processing circuits, such as a general purpose and/or special purpose processor (e.g., microprocessor and/or digital signal processor). The processor 400 is configured to execute the program code 412 in the memory 410, described below as a computer readable medium, to perform some or all of the operations and methods that are described herein for one or more of the embodiments. The network interface 420 is configured to communicatively connect to components of the IFE system 10 of FIG. 2, such as through network 30. The content and service curation controller 110 may further include a display device 430 and a user input interface (e.g., keypad, keyboard, touch sensitive interface).

The content and service curation controller 110 can be electrically connected to receive video data from cameras 450, biometric data from biometric sensors 460, and/or acceleration data from an accelerometer 470. Each of the cameras 450 generate a video signal and are positioned view a passenger who is seated within the aircraft and may be operating a VDU 104 and/or using a PED 100. The processor 400 processes the video signal using image detection algorithms, such as eye tracking algorithms, facial feature expression detection algorithms, and using defined rules to identify where a passenger is looking relative to the cabin and/or a VDU 104, and/or to characterize passenger demographics, passenger emotions, passenger attentiveness, and/or other tracked passenger characteristics. The processor 400 may further operate to track content and/or services that were consumed or particular portions of content/service that were consumed through a VDU 104 and/or a PED 100 by an identified passenger and/or through a crew member (e.g., offering food, drink, reading materials, product(s) for sale).

The processor 400 processes biometric data from the biometric sensors 460 to individually characterize passengers. The biometric data may be received through a RF transceiver connection to fitness tracking devices, which may include mobile phones, fitness tracking devices worn by passengers, etc.) carried by the passengers. The biometric sensors 460 may be configured to sense biometric that can include, but is not limited to, passenger's temperature, passenger's heart rate, passenger's respiration rate, passenger's weight, passenger's fingerprint, passenger's iris features, and/or other biometric attributes of the passenger. The biometric sensors 460 may be contained within a headphone worn by the passenger, contained in an armrest or other seat surface of a seat occupied by the passenger, or be contained or provided by one or more other components of the system 10.

The processor 400 processes the acceleration data from the accelerometer 470 to characterize occurrence of turbulence events, which may include identifying their duration, start time relative to boarding or other timing event, strength metric(s), number of turbulence events and elapsed time therebetween.

Further Embodiments and Definitions

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluеRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

We claim:

1. A method performed by a controller device in communication with service delivery devices of an aircraft in-flight entertainment (IFE) system, the method comprising:
receiving objective information associated with an aircraft comprising the aircraft IFE system;
receiving subjective passenger information associated with a passenger of the aircraft from a monitoring application operating on a personal electronic device of the passenger;
determining a service to deliver to the passenger during a flight on the aircraft based on the received objective and subjective passenger information;
determining a time to deliver the service to the passenger during the flight based on a sequence of service delivery events and frequency of the sequence of service delivery events for the passenger from a previous flight;
identifying a service delivery device among the service delivery devices installed within the aircraft that is associated with a seat of the aircraft that is assigned to the passenger; and
controlling delivery of the determined service during the flight to the identified service delivery device installed within the aircraft at the time to deliver the service to the passenger during the flight.

2. The method of claim 1, wherein the objective information identifies one or more of pre-airport arrival events, pre-boarding events, boarding events, takeoff events, service events within the aircraft, turbulence events, landing events, connecting flight, departure city information, and arrival city information.

3. The method of claim 2, wherein the determination of the service is performed based on subjective information that identifies one or more of current and previous flight information, content preference information, content and services consumed during current or previous flight information, eye tracking during flight information, flight sleep pattern information, and biometric information obtained during flight information.

4. The method of claim 1, wherein the subjective passenger information comprises information obtained by the monitoring application observing application programming interface (API) calls by one or more applications operating on the personal electronic device to an operating system of the personal electronic device or another application operating on the personal electronic device.

5. The method of claim 1, wherein the monitoring application electronically performs a function call to an API of one or more of a web browser, media player application, gaming application, or social media application operating on the personal electronic device.

6. The method of claim 1, wherein receiving subjective passenger information associated with the passenger of the aircraft further comprises receiving biometric information associated with the passenger from at least one of a passenger carried biometric electronic device within the aircraft and a biometric sensor mounted within the seat.

7. The method of claim 6, wherein determining the service to deliver to the passenger during the flight on the aircraft comprises:
determining sleep data associated with the passenger based on the received biometric information; and
determining an optimal resting period for the passenger based the determined sleep data.

8. The method of claim 7, wherein identifying a service delivery device among the service delivery devices installed within the aircraft that is associated with the seat comprises identifying one or more electronic mechanisms associated with the seat; and
wherein controlling delivery of the determined service during the flight to the identified service delivery device installed within the aircraft comprises controlling operations of the one or more identified electronic mechanisms to execute the determined optimal resting period for the passenger.

9. The method according to claim 1, wherein determining the service to deliver to the passenger comprises determining controlling operations of one or more electronically controlled mechanisms installed within the aircraft and associated with the seat based on the received objective and subjective passenger information.

10. The method of claim 9, wherein electronically controlling operations of the one or more electronically controlled mechanisms installed within the aircraft and associated with the seat comprises one of:
electronically controlling operations of a massage mechanism of the seat to deliver a massage to the passenger;

electronically controlling operations of a temperature control mechanism associated with the seat to adjust an ambient temperature in a region of the passenger;

electronically controlling operations of an ambient lighting circuit associated with the seat to adjust an ambient light in the region of the passenger;

electronically controlling operations of a seat position mechanism of the seat to adjust a seat position of the set; and electronically controlling operations of a window shade position mechanism associated with the seat to adjust a height of the window shade adjacent to the passenger.

11. The method of claim 1, wherein determining the service to deliver to the passenger during the flight on the aircraft comprises determining an in-flight service recommendation for the passenger during a flight on the aircraft based on the received objective and subjective passenger information.

12. The method of claim 11, wherein determining the time to deliver the service recommendation to the passenger during the flight comprises
determining a time to deliver the in-flight service recommendation based on the identified sequence of service delivery events and the frequency of the sequence of service delivery events.

13. The method of claim 12, wherein controlling delivery of the determined service during the flight to the identified service delivery device comprises controlling delivery of the determined in-flight service recommendation to one of a display device installed in the aircraft and associated with the seat and a personal electronic device associated with the passenger based on the determined time to deliver the in-flight recommendation to the passenger.

14. The method of claim 12, further comprising:
communicating the in-flight service recommendation and the time to deliver the in-flight service recommendation to a crew terminal operating in the aircraft IFE system.

15. The method of claim 1, further comprising:
determining the passenger is accompanied with another passenger on the flight; and
wherein determining the service to deliver to the passenger during the flight on the aircraft comprises:
determining an effect on preferences of the passenger when accompanied with another passenger; and
determining the service to deliver to the passenger based on the determined effect on preferences of the passenger when accompanied with another passenger.

16. The method of claim 15, wherein determining the effect on preferences of the passenger when accompanied with another passenger comprises:
determining the another passenger is one of seated adjacent to or seated within a threshold distance of the passenger on the flight; and
determining the effect based on the determination the another passenger is seated one of adjacent to or within the threshold distance of the passenger.

17. The method of claim 1, wherein the objective information comprises flight delay information; and
wherein determining the service to deliver to the passenger during the flight on the aircraft comprises determining the service to deliver based on the flight delay information.

18. The method of claim 17, wherein determining the service to deliver based on the flight delay information comprises:

identifying a premium service offered during the flight to provide as a complimentary service to the passenger during the flight; and
selecting the premium service to deliver to the passenger during the flight.

19. A system for controlling delivery of in-flight content and services to passengers of an aircraft, the system comprising:
an in-flight entertainment (IFE) system of the aircraft comprising:
a plurality of service delivery devices installed within the aircraft and associated with passenger seats of the aircraft;
an IFE controller in communication with the plurality of service delivery devices and configured to deliver the in-flight content and services to the service delivery devices;
a controller device in communication with the IFE system, the controller device configured to:
receive objective information of events associated with a flight of the aircraft comprising the aircraft IFE system;
receive subjective passenger information associated with a passenger of the aircraft from a monitoring application operating on a personal electronic device of the passenger;
determine a service to deliver to the passenger during a flight on the aircraft based on the received objective and subjective passenger information;
determine a time to deliver the service to the passenger during the flight based on a sequence of service delivery events and frequency of the sequence of service delivery events for the passenger from a previous flight;
identify a service delivery device among the service delivery devices installed within the aircraft that is associated with a seat of the aircraft that is assigned to the passenger; and
control delivery of the determined service during the flight to the identified service delivery device installed within the aircraft at the time to deliver the service to the passenger during the flight.

20. The system of claim 19, wherein a set of the plurality of service delivery devices comprise visual display units (VDUs) of the passenger seats of the aircraft.

21. The system of claim 19, wherein a set of the plurality of service delivery devices comprise electronic mechanisms associated with the passenger seats of the aircraft.

22. The method of claim 9, wherein controlling delivery of the determined service during the flight to the identified service delivery device installed within the aircraft at the time to deliver the service to the passenger during the flight comprises automatically controlling operations of one or more electronically controlled mechanisms installed within the aircraft and associated with the seat at the time to deliver the service to the passenger during the flight.

23. The method of claim 22, wherein automatically electronically controlling operations of the one or more electronically controlled mechanisms installed within the aircraft and associated with the seat comprises one of:
automatically electronically controlling operations of a massage mechanism of the seat to deliver a massage to the passenger; and
automatically electronically controlling operations of a seat position mechanism of the seat to adjust a seat position of the set.

24. The method of claim 1, further comprising receiving sensor data from a sensor installed in one of a tray table or an armrest associated with the seat of the aircraft that is assigned to the passenger; and
    wherein determining the service to deliver to the passenger during a flight on the aircraft further based on the received sensor data from the sensor installed in one of the tray table or armrest associated with the seat of the aircraft that is assigned to the passenger.

25. The method of claim 24, wherein the sensor comprises an infrared sensor installed in one of the tray table or the armrest associated with the seat of the aircraft that is assigned to the passenger.

26. A controller device in communication with service delivery devices of an aircraft in-flight entertainment (IFE) system, the controller device comprising:
    a processor; and
    a memory comprising executable instructions that when executed by the processor cause the processor to perform operations comprising:
        receiving objective information associated with an aircraft comprising the aircraft IFE system;
        receiving subjective passenger information associated with a passenger of the aircraft from a monitoring application operating on a personal electronic device of the passenger;
        determining a service to deliver to the passenger during a flight on the aircraft based on the received objective and subjective passenger information;
        determining a time to deliver the service to the passenger during the flight based on a sequence of service delivery events and frequency of the sequence of service delivery events for the passenger from a previous flight;
        identifying a service delivery device among the service delivery devices installed within the aircraft that is associated with a seat of the aircraft that is assigned to the passenger; and
        controlling delivery of the determined service during the flight to the identified service delivery device installed within the aircraft at the time to deliver the service to the passenger during the flight.

\* \* \* \* \*